United States Patent
Ma et al.

(10) Patent No.: US 12,547,893 B2
(45) Date of Patent: *Feb. 10, 2026

(54) PERFORMING VISUAL RELATIONAL REASONING

(71) Applicant: NVIDIA Corporation, Santa Clara, CA (US)

(72) Inventors: Xiaojian Ma, Los Angeles, CA (US); Weili Nie, Sunnyvale, CA (US); Zhiding Yu, Santa Clara, CA (US); Huaizu Jiang, Amherst, MA (US); Chaowei Xiao, Seattle, WA (US); Yuke Zhu, Austin, TX (US); Anima Anandkumar, Pasadena, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 17/893,026

(22) Filed: Aug. 22, 2022

(65) Prior Publication Data

US 2024/0078423 A1  Mar. 7, 2024

(51) Int. Cl.
   *G06N 3/08* (2023.01)
   *G06F 16/55* (2019.01)
   *G06N 3/04* (2023.01)

(52) U.S. Cl.
   CPC ........... *G06N 3/08* (2013.01); *G06F 16/55* (2019.01); *G06N 3/04* (2013.01)

(58) Field of Classification Search
   CPC . G06N 3/08; G06N 3/04; G06N 3/045; G06F 16/55
   See application file for complete search history.

(56) References Cited

U.S. PATENT DOCUMENTS

2022/0383120 A1* 12/2022 Bahri ................ G06N 3/047
2023/0329646 A1  10/2023 Zhou et al.
2024/0062534 A1  2/2024 Ma et al.

OTHER PUBLICATIONS

Y. Li, T. Yao, Y. Pan and T. Mei, "Contextual Transformer Networks for Visual Recognition," in IEEE Transactions on Pattern Analysis and Machine Intelligence, vol. 45, No. 2, pp. 1489-1500, Feb. 1, 2023, doi: 10.1109/TPAMI.2022.3164083. (first published to public Apr. 1, 2022) (Year: 2022).*

Shaofeng Zhang, Feng Zhu, Rui Zhao, Junchi Yan, "Contextual Image Masking Modeling via Synergized Contrasting without View Augmentation for Faster and Better Visual Pretraining", ICLR 2023 Conference Blind Submission, Sep. 22, 2022. (Year: 2022).*

(Continued)

*Primary Examiner* — James T Tsai
(74) *Attorney, Agent, or Firm* — Zilka-Kotab, P.C.

(57) ABSTRACT

A vision transformer (ViT) is a deep learning model that performs one or more vision processing tasks. ViTs may be modified to include a global task that clusters images with the same concept together to produce semantically consistent relational representations, as well as a local task that guides the ViT to discover object-centric semantic correspondence across images. A database of concepts and associated features may be created and used to train the global and local tasks, which may then enable the ViT to perform visual relational reasoning faster, without supervision, and outside of a synthetic domain.

15 Claims, 10 Drawing Sheets

(56) References Cited

OTHER PUBLICATIONS

Yang, et al. "Visual Concepts Tokenization," 36th Conference on Neural Information Processing Systems (NeurIPS 2022). (Year: 2022).*

Ma et al., U.S. Appl. No. 17/893,038, filed Aug. 22, 2022.

Caron et al., "Emerging Properties in Self-Supervised Vision Transformers," arXiv, 2021, 21 pages, retrieved from https://arxiv.org/pdf/2104.14294.pdf.

Chen et al., "An Empirical Study of Training Self-Supervised Vision Transformers," arXiv, 2021, pp. 1-10, retrieved from https://arxiv.org/abs/2104.02057.

Dosovitskiy et al., "An Image is Worth 16×16 Words: Transformers for Image Recognition at Scale," arXiv preprint, 2020, pp. 1-21.

Hill et al., "Grounded language learning fast and slow," arXiv, 2020, pp. 1-17, retrieved from https://arxiv.org/pdf/2009.01719.pdf.

Hou et al., "Visual Compositional Learning for Human-Object Interaction Detection," ECCV, 2020, 19 pages, retrieved from https://arxiv.org/abs/2007.12407.

Jiang et al., "In Defense of Grid Features for Visual Question Answering," CVPR, 2020, 12 pages, retieved https://arxiv.org/abs/2001.03615.

Johnson et al., "CLEVR: A Diagnostic Dataset for Compositional Language and Elementary Visual Reasoning," CVPR, 2017, pp. 2901-2910, retrieved from https://openaccess.thecvf.com/content_cvpr_2017/papers/Johnson_CLEVR_A_Diagnostic_CVPR_2017_paper.pdf.

Koh et al., "Concept Bottleneck Models," Proceedings of the 37th International Conference on Machine Learning, vol. 119, 2020, 11 pages, retrieved https://proceedings.mlr.press/v119/koh20a.html.

Li et al., "Efficient self-supervised vision transformers for representation learning," ICLR, 2022, pp. 1-27, retrieved from https://arxiv.org/abs/2106.09785.

Liu et al., "SIFT Flow: Dense Correspondence across Scenes and its Applications," preprint for IEEE Transactions on Pattern Analysis and Machine Intelligence, 2010, pp. 1-17, retrieved from https://people.csail.mit.edu/celiu/SIFTflow/SIFTflow.pdf.

Liu et al., "Swin Transformer: Hierarchical Vision Transformer using Shifted Windows," arXiv, 2021, 14 pages, retrieved from https://arxiv.org/pdf/2103.14030.pdf.

Ren et al., "Faster R-CNN: Towards Real-Time Object Detection with Region Proposal Networks," Advances in Neural Information Processing Systems (NIPS 2015), 2015, pp. 1-9, retrieved from https://papers.nips.cc/paper/2015/hash/14bfa6bb14875e45bba028a21ed38046-Abstract.html.

Ruis et al., "A Benchmark for Systematic Generalization in Grounded Language Understanding," arXiv, 2020, 18 pages, retrieved from https://arxiv.org/pdf/2003.05161.pdf.

Shen et al., "Scaling Human-Object Interaction Recognition through Zero-Shot Learning," IEEE Winter Conference on Applications of Computer Vision (WACV), 2018, 9 pages, retrieved from http://vision.stanford.edu/pdf/shen2018wacv.pdf.

Wang et al., "Pyramid Vision Transformer: A Versatile Backbone for Dense Prediction without Convolutions," arXiv, 2021, 15 pages, retrieved from https://arxiv.org/pdf/2102.12122.pdf.

Wang et al., "Transitive Invariance for Self-supervised Visual Representation Learning," ICCV, 2017, pp. 1329-1338, retrieved from https://openaccess.thecvf.com/content_ICCV_2017/papers/Wang_Transitive_Invariance_for_ICCV_2017_paper.pdf.

Wang et al., "Learning Correspondence from the Cycle-consistency of Time," CVPR, 2019, pp. 2566-2576, retrieved from https://openaccess.thecvf.com/content_CVPR_2019/papers/Wang_Learning_Correspondence_From_the_Cycle-Consistency_of_Time_CVPR_2019_paper.pdf.

Wang et al., "Dense Contrastive Learning for Self-Supervised Visual Pre-Training," CVPR, 2021, pp. 3024-3033.

Yi et al., "Neural-Symbolic VQA: Disentangling Reasoning from Vision and Language Understanding," arXiv, 2019, 19 pages, retrieved from https://arxiv.org/pdf/1810.02338.pdf.

Non-Final Office Action from U.S. Appl. No. 17/893,038, dated May 20, 2025.

Bansal et al., "Detecting Human-Object Interactions via Functional Generalization," Proceedings of the Tirty-Fourth AAAI Conference on Artificial Intelligence, 2020, pp. 10460-10469.

Kim et al., "HOTR: End-to-End Human-Object Interaction Detection with Transformers," arXiv, 2021, 10 pages.

Ma et al. "RelVit: Concept-guided Vision Transformer for Visual Relational Reasoning," ICLR, 2022, pp. 1-19.

Final Office Action from U.S. Appl. No. 17/893,038, dated Oct. 10, 2025.

* cited by examiner

PERFORMING VISUAL RELATIONAL REASONING

FIELD OF THE INVENTION

The present invention relates to image analysis, and more particularly to performing visual relational reasoning for a provided image.

BACKGROUND

Deep neural networks have achieved great success in visual recognition. However, their ability for visual relational reasoning (e.g., reasoning with entities and their relationships in a visual scene) still falls short of human-level performances, especially in real-world domains. The challenges of common visual relational reasoning tasks are manifested in three aspects: 1) object-centric learning to identify objects (including humans) as well as their visual properties; 2) relational reasoning to infer all pairwise relationships between the object entities; and 3) systematic generalization to reason with visual entities and relations on novel object-relation combinations and extrapolate to longer reasoning hops. To this end, the problem to be solved is the improvement of current deep learning algorithms in performing visual relational reasoning.

Currently there are two ways of tackling the challenges in visual relational reasoning. The first is leveraging pretrained object detectors to identify object entities, based on which the relationships among object entities can be learned. This approach normally runs slowly and requires region supervision (e.g., bounding boxes of objects) that might be expensive to obtain. The second approach is combining explicit symbolic reasoning with deep recognition modules, where neural networks are used to infer structural scene representation from images, where a symbolic program executor runs the program on the scene representation for reasoning. This approach currently only works in the synthetic domain, rather than open-ended real-world scenarios.

DETAILED DESCRIPTION

A vision transformer (ViT) is a deep learning model that performs one or more vision processing tasks. ViTs may be modified to include a global task that clusters images with the same concept together to produce semantically consistent relational representations, as well as a local task that guides the ViT to discover object-centric semantic correspondence across images. A database of concepts and associated features may be created and used to train the global and local tasks, which may then enable the ViT to perform visual relational reasoning faster, without supervision, and outside of a synthetic domain.

Figure 1:
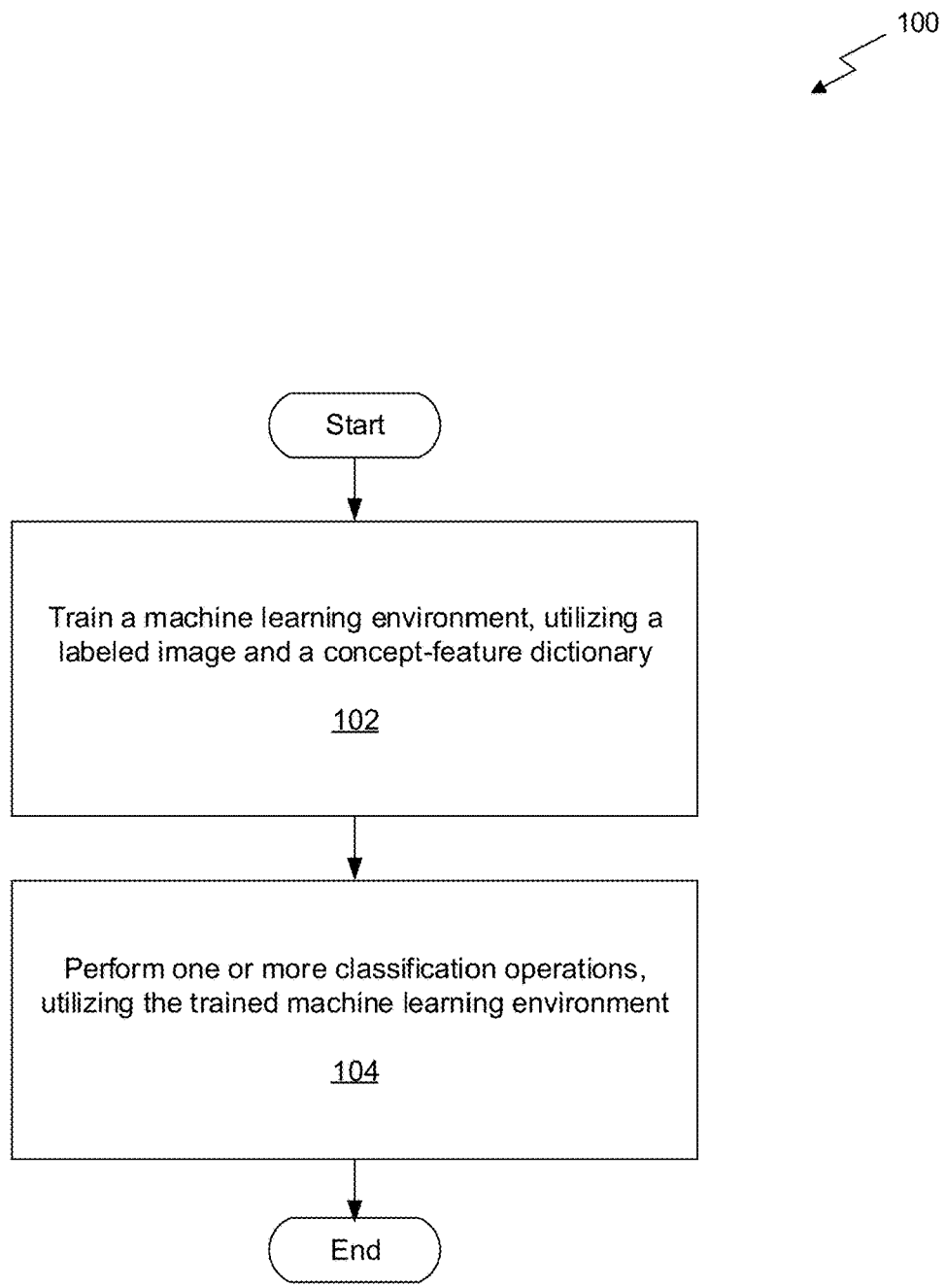
FIG. 1 illustrates a flowchart of a method for performing visual relational reasoning, in accordance with an embodiment.

FIG. 1 illustrates a flowchart of a method 100 for performing visual relational reasoning, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a machine learning environment is trained utilizing a labeled image and a concept-feature dictionary. In one embodiment, the machine learning environment may include a neural network (e.g., an artificial neural network (ANN) such as a convolutional neural network (CNN), etc.). In another embodiment, the machine learning environment may include a deep learning model such as a transformer. For example, the transformer may include a vision transformer (ViT) used for performing one or more vision processing tasks.

Additionally, in one embodiment, the concept-feature dictionary may include a database of concepts. In another embodiment, each of the concepts within the dictionary may be represented by a key. For example, the key may include a predetermined grouping of data such as a tuple that includes objects representing an object and an associated action (e.g., an <action, object> tuple, a <subject, action, object> tuple, a <setting, action, object> tuple, etc.). In another embodiment, each key within the dictionary may be linked to an associated plurality of features. For example, the plurality of features for a key may be stored in a queue pointed to by the associated key.

Further, in one embodiment, each of the plurality of features may be extracted from an input image. For example, an input image may be provided with an associated (e.g., manually entered) key (such as an <action, object> tuple). In another example, analysis may be performed on the image (e.g., using one or more machine learning environments) to determine one or more features of the image. These features may be stored in a queue of features that is associated with the key for the image.

In this way, each queue for a key may store features that satisfy the concept represented by the key. In one embodiment, storing only the features for a key (instead of the images associated with the key) may reduce an amount of storage needed to store the dictionary.

Further still, in one embodiment, training the machine learning environment may include performing one or more concept-guided auxiliary tasks. For example, the auxiliary tasks may include one or more global tasks and one or more local tasks that are performed in addition to a standard training pipeline (e.g., a ViT training pipeline, etc.).

Also, in one embodiment, training the machine learning environment may include performing one or more global training operations within the machine learning environment, utilizing the labeled image and the concept-feature dictionary. For example, the global training operations may train a global task within the machine learning environment that clusters images with the same concept together to produce semantically consistent relational representations. In another example, an input image may be received and modified to create an augmented image. For instance, one or more or more predefined actions (e.g., cropping, rotating, translating, etc.) may be performed on the input image to create the augmented image.

In addition, in one embodiment, an associated concept may be determined for the input image. For example, the associated concept may have been previously manually added/linked to the image (e.g., as metadata, etc.). In another example, the associated concept may include a key.

Furthermore, in one embodiment, an image feature may be retrieved from the concept-feature dictionary, utilizing the associated concept for the input image. For example, the key for the concept may be cross-referenced against the concept-feature dictionary to determine a matching key within the dictionary. In another example, within the dictionary, one of a plurality of features may be retrieved from a queue linked to the matching key. In yet another example, the feature may be retrieved from the queue by performing random (e.g., uniform) sampling. In still another example, the most recently stored feature in the queue may be retrieved. Of course, however, any sampling method may be used to retrieve a feature from the queue.

Further still, in one embodiment, the input image or the augmented image may be replaced with the retrieved image feature from the concept-feature dictionary. In another embodiment, contrastive learning may then be performed using the input image or the augmented image, and the retrieved image feature. For example, the contrastive learning may use cross-entropy loss to minimize global loss within the machine learning environment. In another example, the image feature may be used as output for the loss, with a goal of minimizing a global loss.

In this way, the machine learning environment may be trained to cluster images having the same concept together to produce semantically consistent relational representations.

Also, in one embodiment, training the machine learning environment may include performing one or more local training operations within the machine learning environment, utilizing the labeled image and the concept-feature dictionary. For example, the local training operations may train a local task within the machine learning environment that guides the environment to discover object-centric semantic correspondence across images. In another embodiment, an input image may be received and modified to create an augmented image. For example, one or more predefined actions (e.g., cropping, rotating, translating, etc.) may be performed on the input image to create the augmented image.

Additionally, in one embodiment, an associated concept may be determined for the input image. For example, the associated concept may be manually added/linked to the image (e.g., as metadata, etc.). In another example, the associated concept may include a key. In another embodiment, an image feature may be retrieved from the concept-feature dictionary, utilizing the associated concept for the input image. In yet another embodiment, the input image or the augmented image may be replaced with the retrieved image feature from the concept-feature dictionary.

Further, in one embodiment, the input image or the augmented image may be tokenized. For example, the input image may be divided by the machine learning environment into a plurality of patches (e.g., tokens) in a grid formation across the input image. In another embodiment, contrastive learning may then be performed using each of the input image tokens or the augmented image tokens, and the retrieved image feature. For example, the contrastive learning may be performed between the image feature and each patch. In another example, during contrastive learning, an optimal correspondence may be determined between patches (e.g., using an arg max operation, etc.).

In this way, the machine learning environment may be trained to discover an object-centric semantic correspondence across multiple images.

Further still, in one embodiment, the concept-feature dictionary may be updated while the machine learning environment is trained. For example, during the global and local training operations, additional features may be extracted from the input image. In another example, these extracted features may be added to the queue linked to the key for the input image.

Also, as shown in operation 104, one or more classification operations are performed utilizing the trained machine learning environment. In one embodiment, an image may be input into the trained machine learning environment. For example, the image may not have an associated concept. In another embodiment, the trained machine learning environment may perform action prediction and object prediction, utilizing the input image.

In addition, in one embodiment, the trained machine learning environment may determine an associated concept for the input image. For example, the associated concept may include an <action, object> tuple. In another embodiment, one or more classification operations may then be performed, utilizing the determined concept.

In this way, the visual relational reasoning performed by the trained machine learning environment may be improved through the implementation of trained global and local operations that enable the trained machine learning environment to perform inference faster, without supervision, and outside of a synthetic domain.

Figure 2:
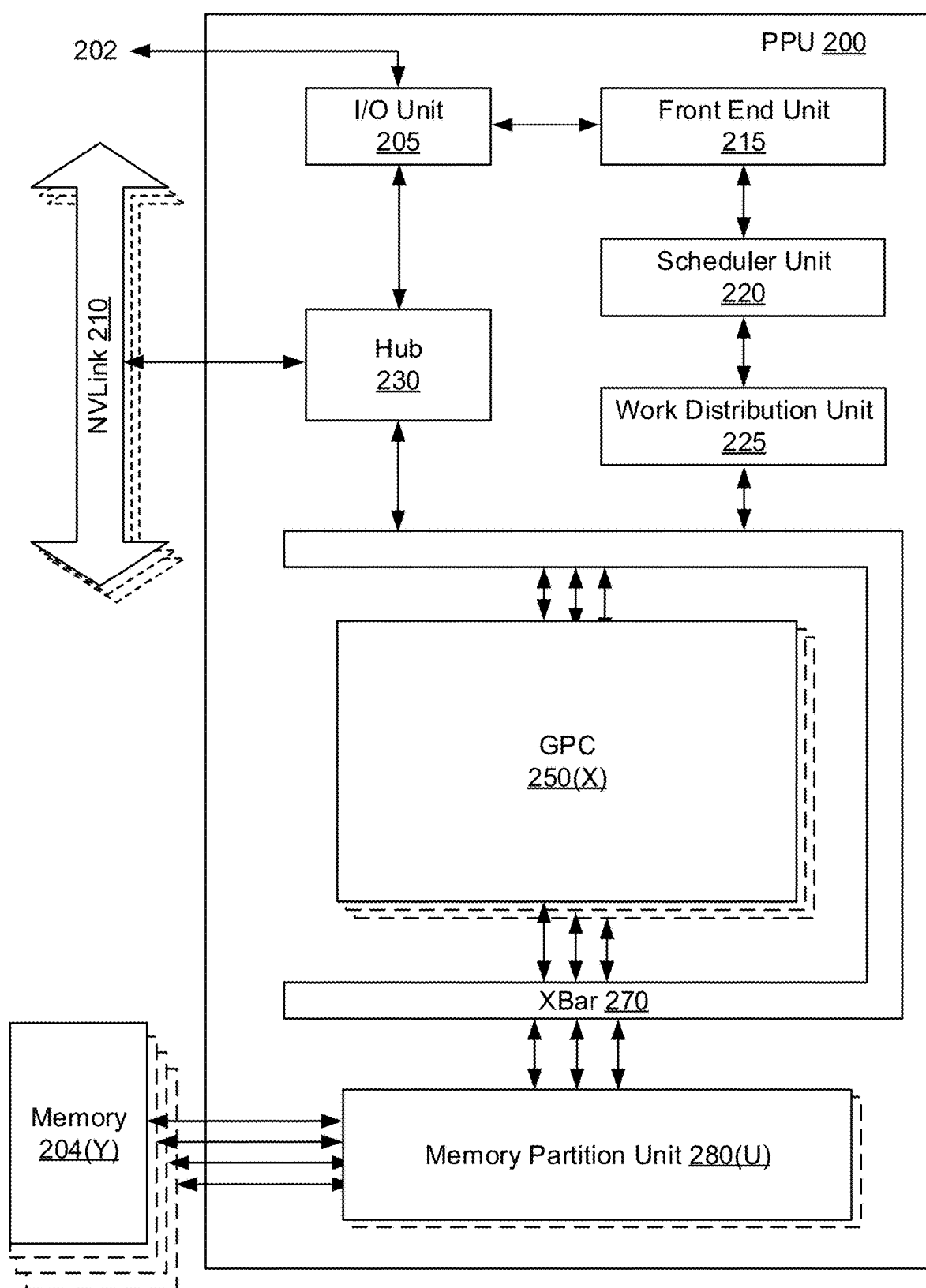
FIG. 2 illustrates a parallel processing unit, in accordance with an embodiment.

In yet another embodiment, the above operations may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225.

The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
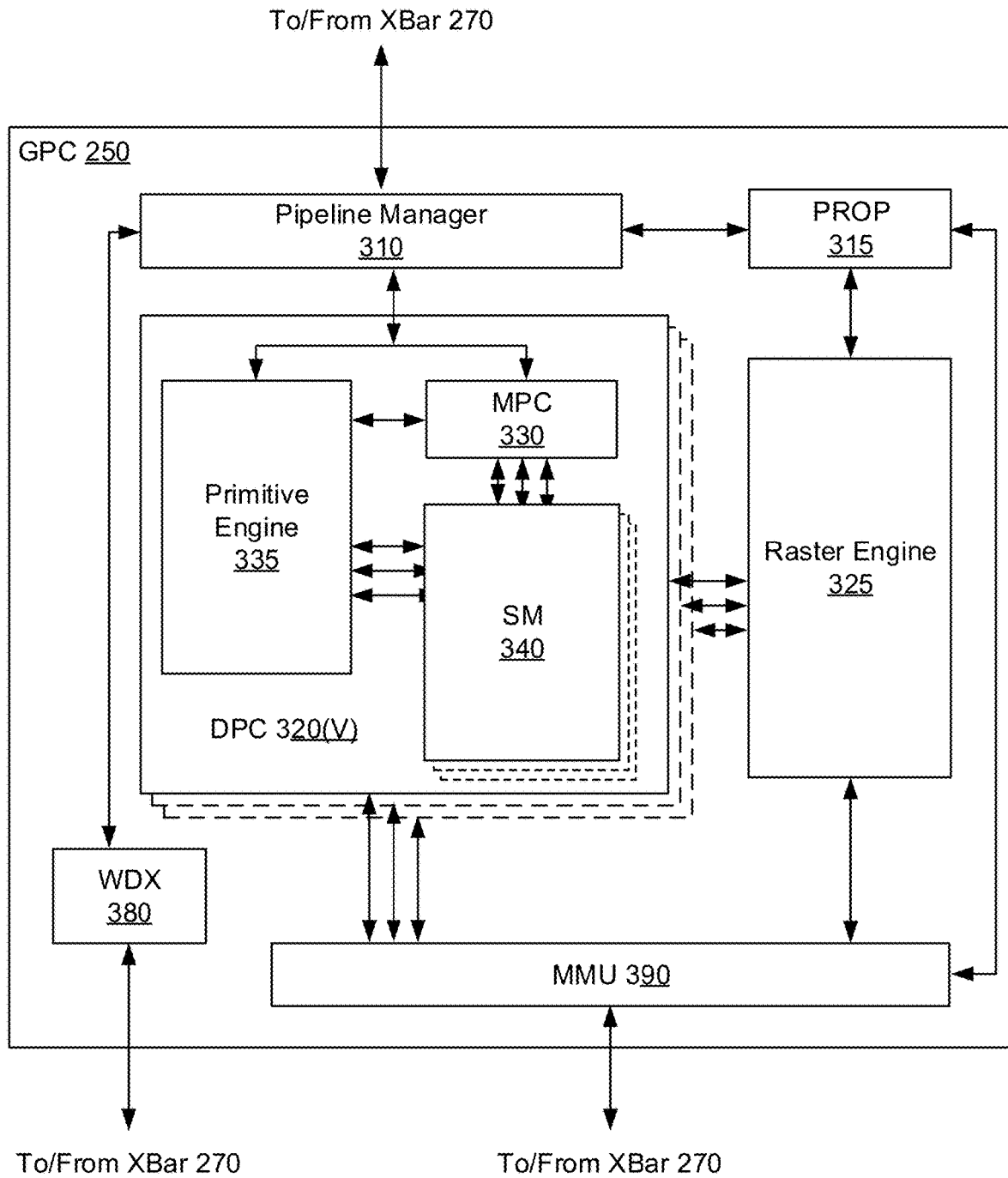
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
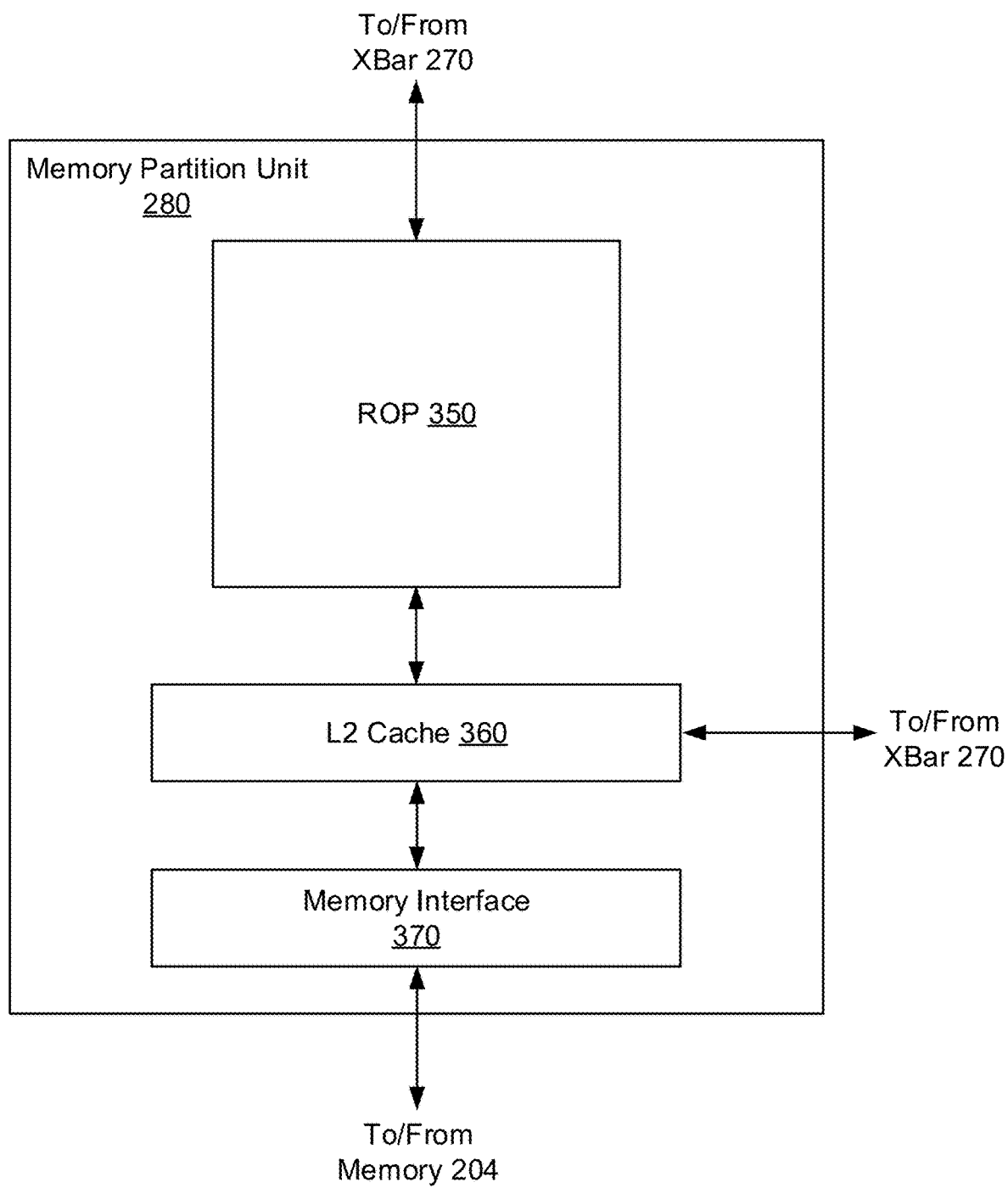
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
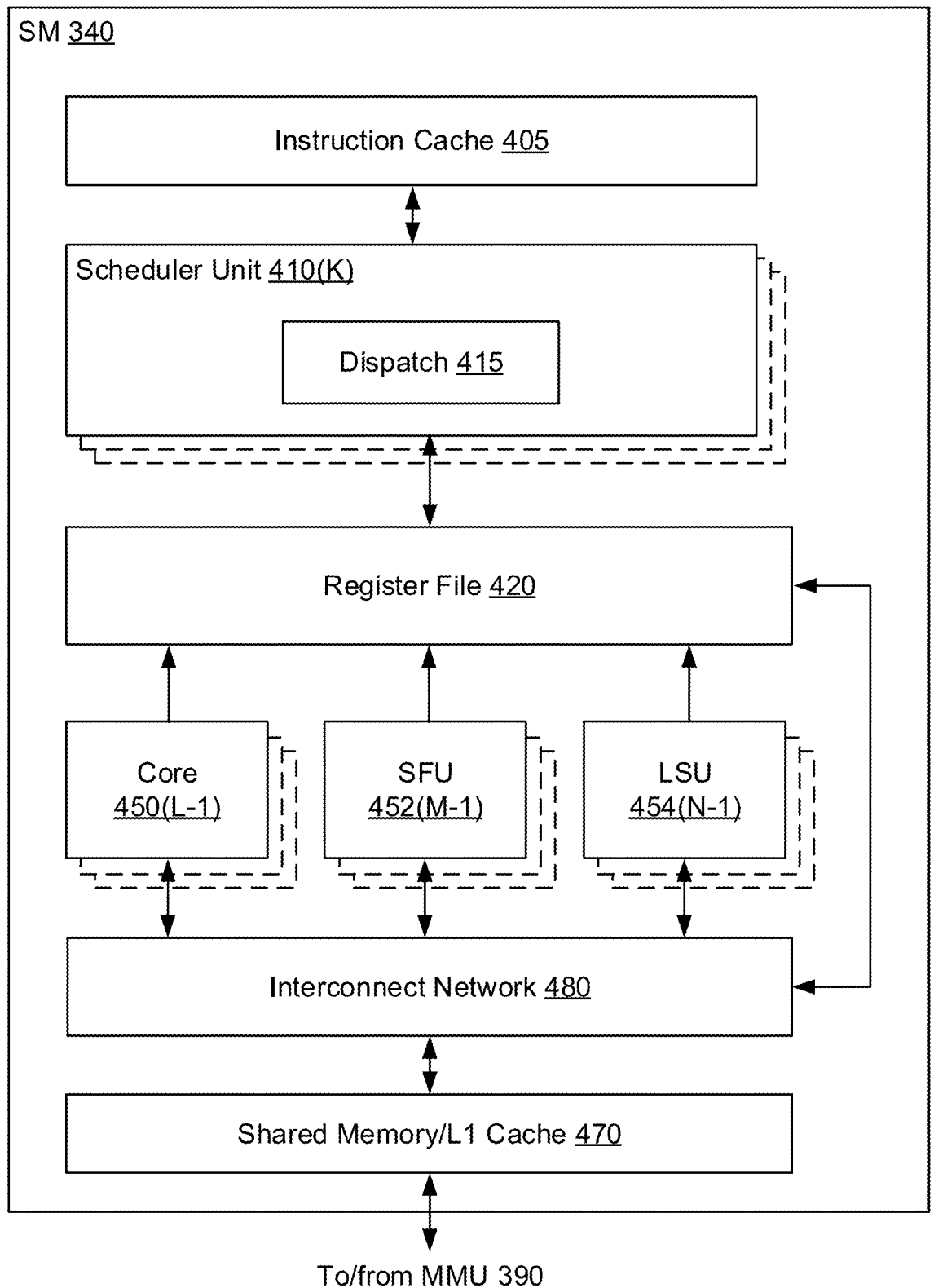
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
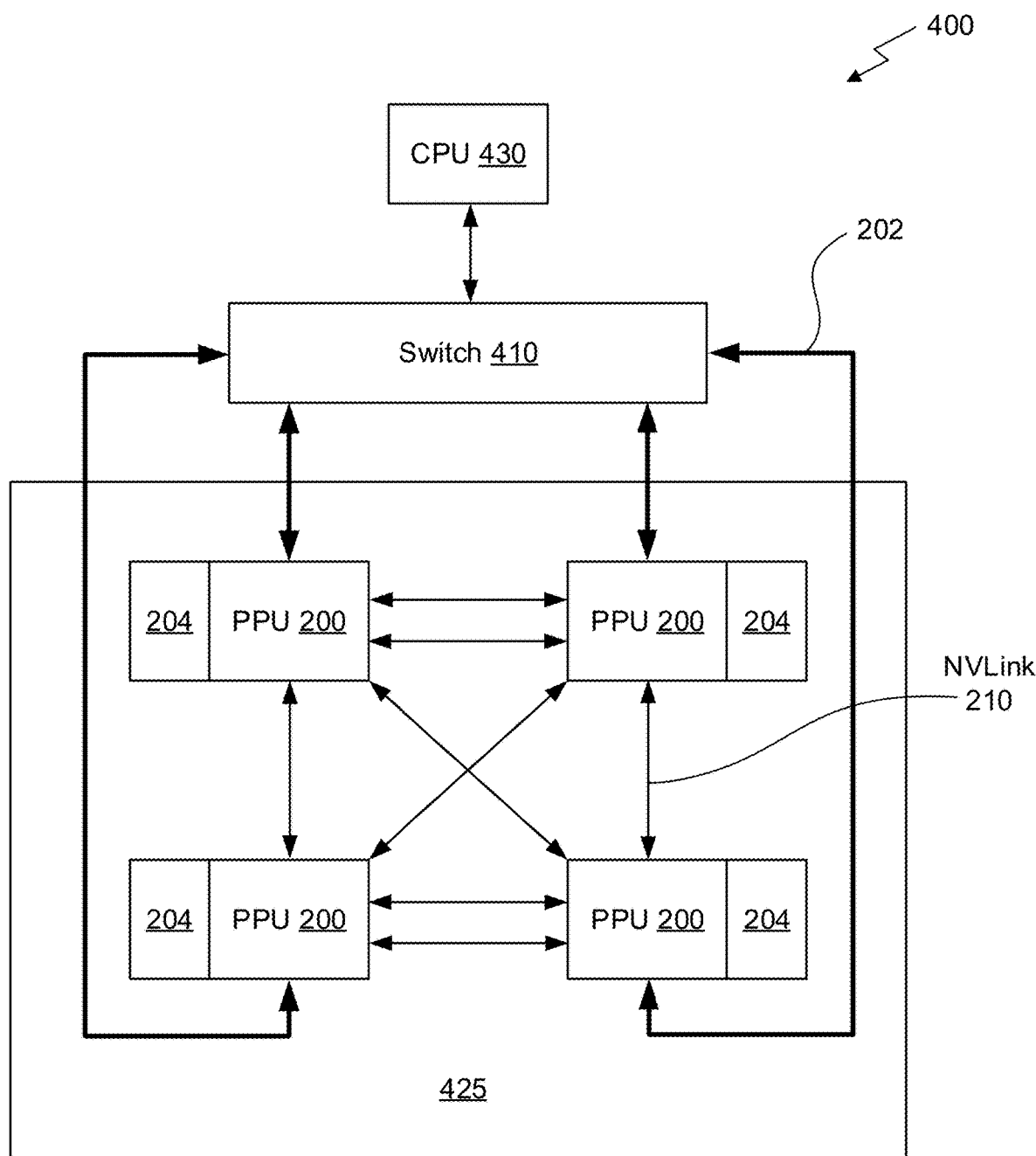
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
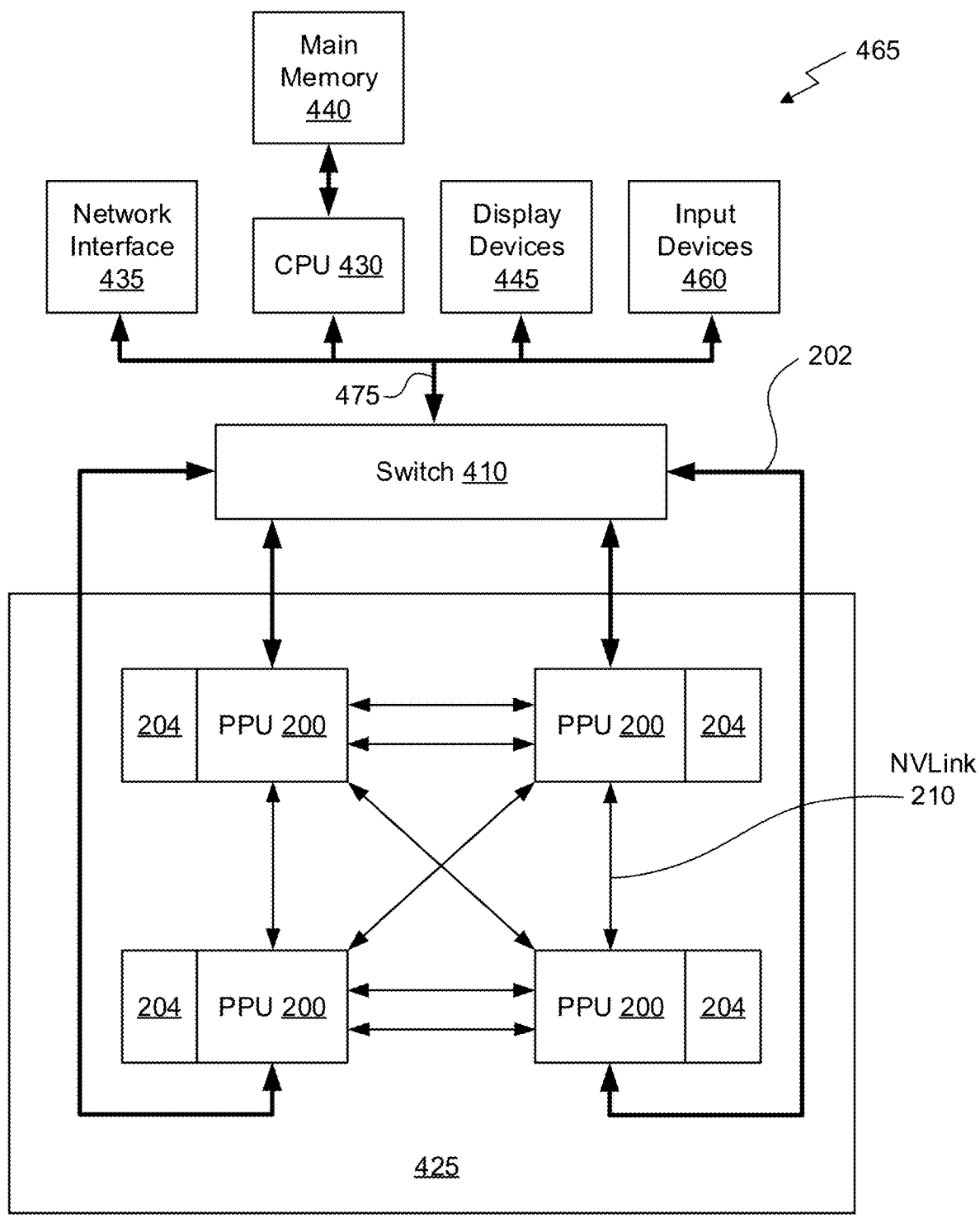
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Concept-Feature Dictionary Population

Figure 5:
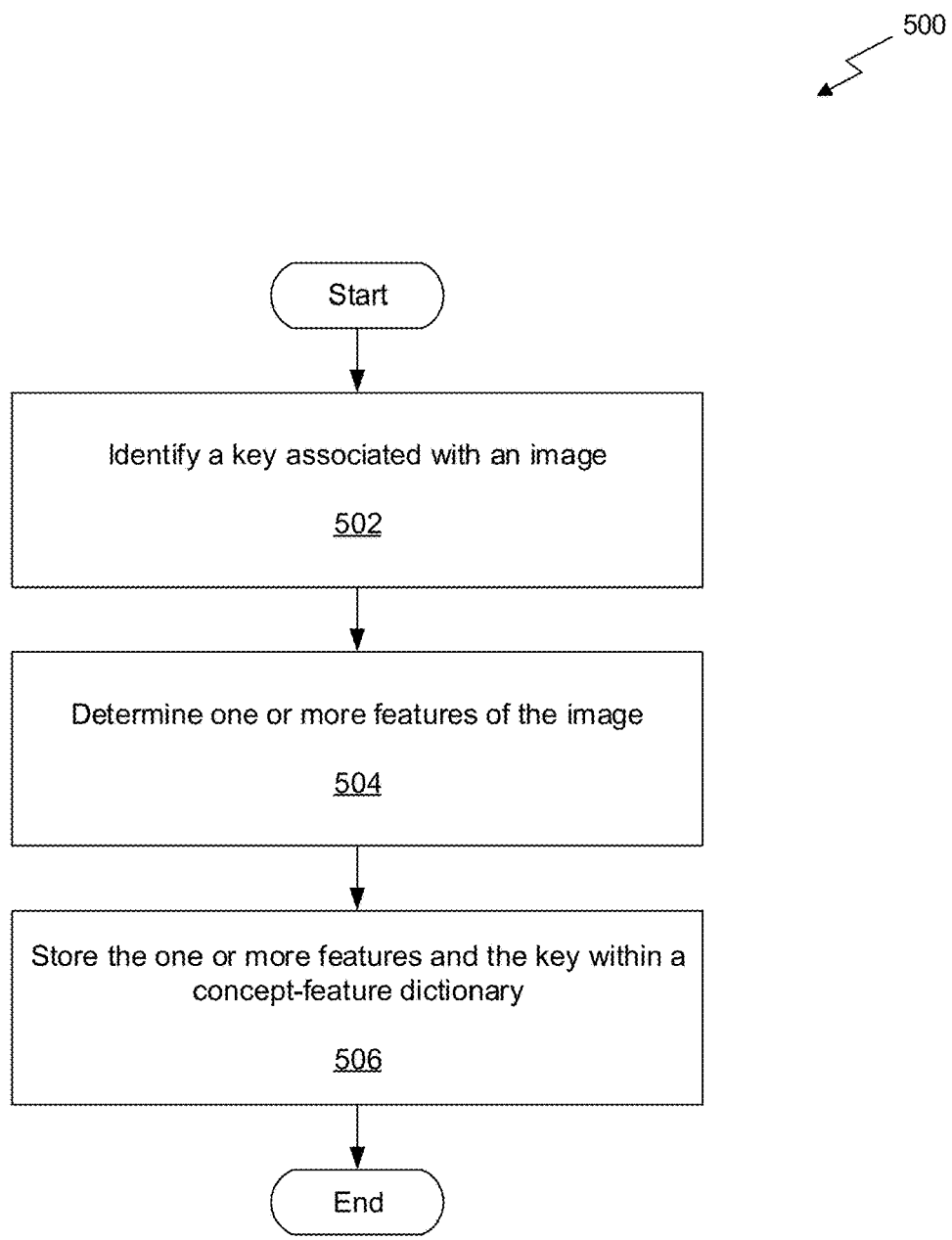
FIG. 5 illustrates a flowchart of a method for populating a concept-feature dictionary, in accordance with an embodiment.

FIG. 5 illustrates a flowchart of a method 500 for populating a concept-feature dictionary, in accordance with an embodiment. Although method 500 is described in the context of a processing unit, the method 500 may also be performed by a program, custom circuitry, or by a combination of custom circuitry and a program. For example, the method 500 may be executed by a GPU (graphics processing unit), CPU (central processing unit), or any processing element. Furthermore, persons of ordinary skill in the art will understand that any system that performs method 500 is within the scope and spirit of embodiments of the present invention.

As shown in operation 502, a key associated with an image is identified. In one embodiment, the key may be manually added to the image (e.g., as metadata, etc.). In another embodiment, key may represent a concept. In yet another embodiment, the key may include a predetermined grouping of data such as an <action, object> tuple representing an object and an associated action.

Additionally, as shown in operation 504, one or more features of the image are determined. In one embodiment, an analysis may be performed on the image (e.g., using one or more machine learning environments) to determine one or more features of the image.

Further, as shown in operation 506, the one or more features and the key are stored within a concept-feature dictionary. In one embodiment, within the concept-feature dictionary, the one or more features may be stored in a queue of features that is linked to the key for the image (e.g., via one or more pointers, etc.).

In this way, a concept-feature dictionary may be created to assist in the training of a machine learning environment.

Exemplary Training Environment

Figure 6:
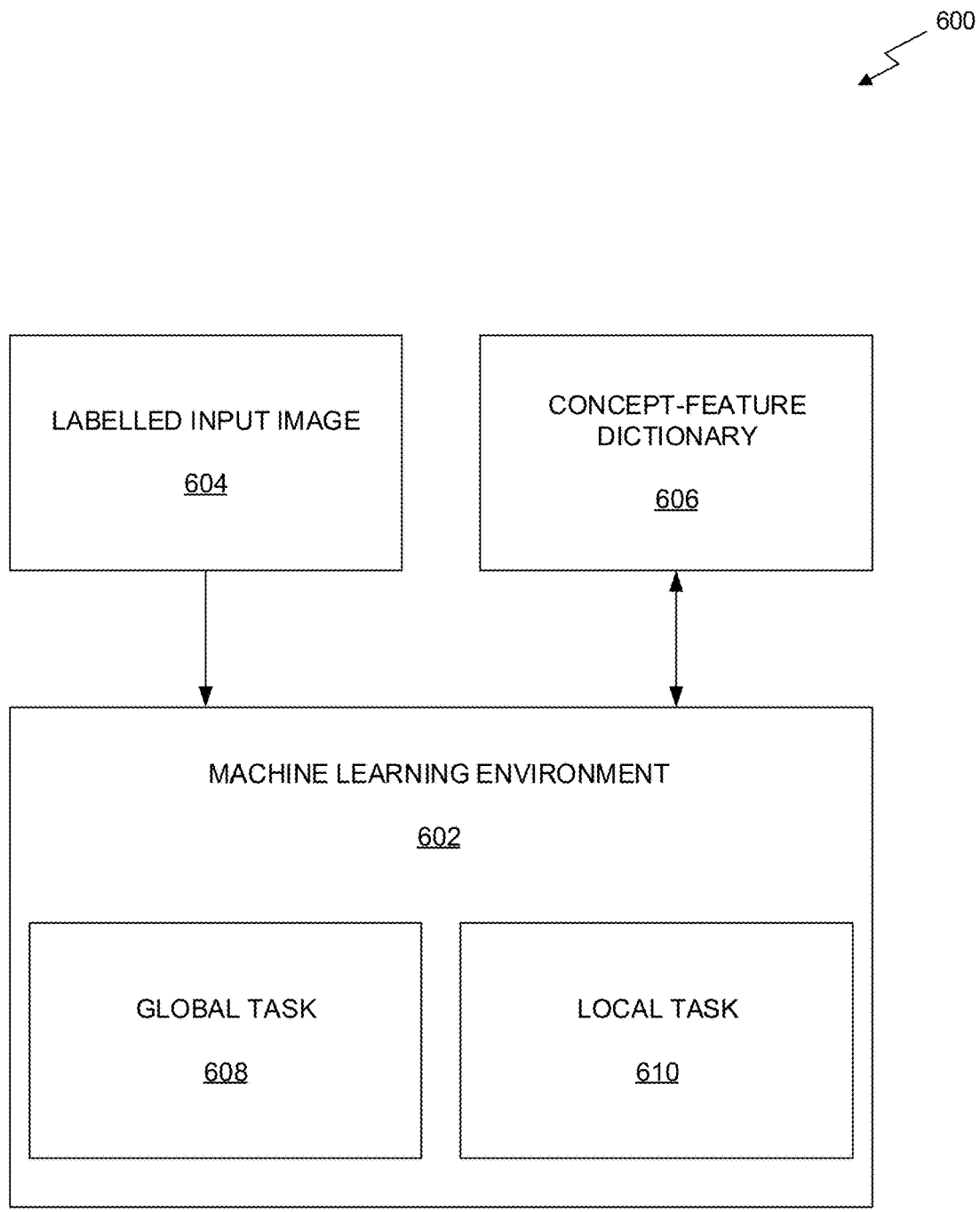
FIG. 6 illustrates an exemplary environment for training a machine learning environment, in accordance with an embodiment.

FIG. 6 illustrates an exemplary environment 600 for training a machine learning environment 602, according to one exemplary embodiment. As shown, a labelled input image 604 may be provided as input to the machine learning environment 602. In one embodiment, the labelled input image 604 may be modified by the machine learning environment 602 to create an augmented image.

Also, in one embodiment, a key may be determined for the labelled input image 604. For example, the labelled input image 604 may include a key that is manually added to the labelled input image 604. In another example, the key may include an <action, object> tuple that identifies a concept associated with the key.

Additionally, in one embodiment, the key may be cross-referenced by the machine learning environment 602 against a concept-feature dictionary 606 to determine a matching key within the dictionary. Further, in one embodiment, within the concept-feature dictionary 606, one of a plurality of features may be retrieved from a queue linked to the matching key.

Further, in one embodiment, the input image or the augmented image may be replaced with the retrieved image feature from the concept-feature dictionary 606, and a global task 608 within the machine learning environment 602 may be trained by performing contrastive learning using the input image or the augmented image, and the retrieved image feature.

Further still, in one embodiment, the input image or the augmented image may be tokenized by the machine learning environment 602, and a local task 610 within the machine learning environment 602 may be trained by performing contrastive learning using the input image tokens or the augmented image tokens, and the retrieved image feature.

Also, in one embodiment, the concept-feature dictionary 606 may be updated while the machine learning environment 602 is trained.

In this way, the global task 608 within the machine learning environment 602 may be trained to cluster images with the same concept together to produce semantically consistent relational representations, and the local task 610 within the machine learning environment 602 may be trained to guide the machine learning environment 602 to discover object-centric semantic correspondence across images.

Relvit: Concept-Guided Vision Transformer for Visual Relational Reasoning

Reasoning about visual relationships is central to how humans interpret the visual world. This task remains challenging for current deep learning algorithms since it requires addressing three key technical problems jointly: 1) identifying object entities and their properties, 2) inferring semantic relations between pairs of entities, and 3) generalizing to novel object-relation combinations, i.e. systematic generalization. In this work, vision transformers (ViTs) may be used as a base model for visual reasoning and to make better use of concepts defined as object entities and their relations to improve the reasoning ability of ViTs. Specifically, a novel concept-feature dictionary may be used to allow flexible image feature retrieval at training time with concept keys. This dictionary enables two new concept-guided auxiliary tasks: 1) a global task for promoting relational reasoning, and 2) a local task for facilitating semantic object-centric correspondence learning. The trained model may be compatible with multiple ViT variants and may be robust to hyper-parameters.

Deep neural networks have achieved great success in visual recognition. However, their ability for visual relational reasoning, i.e. reasoning with entities and their relationships in a visual scene, still falls short of human-level performances, especially in real-world domains. The challenges of common visual relational reasoning tasks, e.g. HICO and GQA benchmarks may be manifested in three aspects: 1) object-centric learning to identify objects (including humans) as well as their visual properties; 2) relational reasoning to infer all pairwise relationships between the object entities; and 3) systematic generalization to reason with visual entities and relations on novel object-relation combinations and extrapolate to longer reasoning hops. While existing models have leveraged pre-trained object detectors and/or explicit symbolic reasoning methods to tackle these challenges, they leave ample space for improvement.

More recently, vision transformers (ViTs) have become the new paradigm for visual recognition and have made great strides in a broad range of visual recognition tasks. Several properties of ViT make it a compelling model choice for visual relational reasoning. First, the self-attention mechanism in ViT offers a strong relational inductive bias, explicitly modeling the relations between input entities. Second, the design of image as patches facilitates the learning of object-centric representations.

To investigate the efficacy of the ViT backbone for visual relational reasoning, in particular on systematic generalization, new systematic splits to canonical benchmarks may be introduced to compare the ViT backbone with the CNN backbone. Results on GQA show that switching to ViTs in MCAN model brings an immediate 11% gain in accuracy. However, the performance gap between the original GQA testing split and the new systematic split remains considerable (15% in accuracy) for both backbones. It suggests that generic ViTs still need to be improved to tackle the reasoning task, especially on systematic generalization. Recent works have shown that neural networks can learn representations with better generalization, by learning certain auxiliary tasks of predicting human-specified concepts. These concepts may be exploited to improve the reasoning ability of ViTs.

In one embodiment, concepts (e.g. the labels in the original training dataset) may be used in the ViT training for improved relational reasoning. To this end, a novel concept-feature dictionary is created, where each key is a concept and its value is a queue of image features with the same concept. This dictionary allows dynamic and flexible training-time image feature retrieval during training. Based on this dictionary, the canonical ViT training pipeline may be augmented with two auxiliary tasks: First, to facilitate high-level reasoning about relationships, a global task may be added that helps cluster images with the same concept together to produce semantically consistent relational representations. Second, to learn better object-centric representations, a local task may be added that guides the model to discover object-centric semantic correspondence across images. Thanks to the plug-and-play feature of our concept-feature dictionary, our auxiliary tasks can be easily incorporated into existing ViT training pipelines without additional input preprocessing. This resulting model may be called a concept-guided vision transformer (or RelViT).

This method may be evaluated on two standard visual relational reasoning benchmarks: HICO and GQA. Beyond the original independent and identically distributed (I.I.D.) training-testing split, new systematic splits may be used for each dataset to examine the ability of systematic generalization, i.e., recognizing novel object-relation combinations. Results show that RelViT significantly outperforms previous approaches. On HICO, it improves the best baseline by 16%, 43%, and 7% on the original non-systematic and two new systematic splits, respectively. On GQA, it further closes the gap of overall accuracy between models using visual backbone feature only and models using additional bounding box features (obtained from pre-trained object detectors) by 13% and 18% on the two splits. This implementation is also compatible with various ViT variants and is robust to hyperparameters. Finally, RelViT improves ViTs on learning relational and object-centric representations.

In one embodiment, RelViT may be implemented by incorporating visual relational concepts to the ViT training with the newly-introduced concept-guided global and local auxiliary tasks, where a concept-feature dictionary enables dynamic and flexible image feature retrieval with the concept keys. In extensive experiments on the original non-systematic and new systematic split of the HICO and GQA datasets, the advantages of RelViT are shown over various strong baselines for visual relational reasoning. Ablation studies are performed on RelViT to show the contributions of its key components, its compatibility to various ViT architectures, and its robustness to hyper-parameters.

Vision Transformers

Given an image $I \in \mathbb{R}^{H \times W \times C}$, a ViT model g first tokenizes the input into N image tokens (patches) with a resolution of $(T,T)$: tokenize$(I)=[t_1, \ldots, t_N]$, $t_i \in \mathbb{R}^{T^2 \times C}$, $N=HW/T^2$, where (H,W) and C denote the original resolution and number of the channel of the image, respectively. Then in each stage, a patch embedding and a multi-head self-attention (MHSA) module is applied to these tokens to produce input for the next stage. The final output of ViT g(I) is a sequence of tokens $[z_1; \ldots; z_N]$ that correspond to the aforementioned input tokens. For global prediction tasks, e.g. image categorization, a summary of the input image can be obtained by either inserting an extra [CLS] token to the input sequence of image tokens or performing an extra pooling operation over the output tokens.

Self-Supervised Learning With DINO and EsViT

One exemplary method is developed upon a self-supervised learning (SSL) approach self-distillation with no labels (DINO) and its follow-up EsViT. Their main idea is to encourage the output consistency between a teacher $g_t$ and a student network $g_s$, parameterized by $\theta_t$ and $\theta_s$, respectively. Given an input image I, both networks map it to a probability distribution $P_t(I)=h_t(g_t(I))$ and $P_s(I)=h_s(g_s(I))$ via an extra projection head h(•). The teacher and student network will be updated alternatively by following these two rules: (1) For the student network:

$\theta_s \leftarrow \arg\min_{\theta_s} \mathcal{L}$ Global, where $\mathcal{L}_{Global}=-P_t(I) \log P_s(I)$;

(2) For the teacher network, $\theta_t$ is updated using an exponential moving average (EMA) on $\theta_s$:

$\theta_t \leftarrow \lambda \theta_t + (1-\lambda)\theta_s$, where λ controls the updating momentum. In practice, multiple views of the input image I will be generated via data augmentation and the teacher and student networks will receive different views, preventing the task from being trivialized. EsViT further extends the image-level loss LGlobal to patch-level by applying dense SSL for learning correspondence between the different views, enhancing the performance on dense prediction.

RelVit

RelViT is a concept-guided ViT that makes better use of the concepts in the ViT training for the improved relational reasoning. In this section, a concept-feature dictionary is introduced to store and retrieve image features with their concept keys. The ViT training pipeline is then augmented with two auxiliary tasks: a global level task and a local level task, both are concept-guided by resorting to the concept-feature dictionary. Intuitively, the global task help cluster images with the same concept together to produce semantically consistent relational features, while the local task guides the model to discover object-centric semantic correspondence across images.

Concept-Feature Dictionary

Assuming the total number of concepts is M, and the set of all concepts $C=\{c_1; \ldots; c_M\}$, a concept-feature dictionary is denoted by $D=\{(c_1,Q_1); \ldots; (c_M,Q_M)\}$, where each concept $c_i$ is associated with a queue $Q_i$ of image features. During training, each image I may come with multiple concepts, which are denoted by $C_I \subset C$. For instance, there may exist several human-object interactions in an image from the HICO dataset, each of which may correspond to a concept. Whenever a new image-concept pair $(I, C_I)$ comes, a concept code c may be uniformly drawn from $C_I$, the queue Q may be selected from the dictionary that corresponds to c, and then the image feature f may be retrieved from Q. Meanwhile, the input image I may be passed to the teacher network $g_t$ to get the new image feature $f'=g_t(I)$, and enqueue it to Q. If Q is full already, the oldest image feature may be dequeued from Q. During training, we use the retrieved image feature f for the two auxiliary tasks below, rather than the input image feature f'.

Furthermore, a sampling strategy, i.e. how to retrieve image feature f from Q, may be applied to the overall performance of this method. The following two sampling strategies may be considered:

Uniform Sampling

Each image feature is drawn with equal probability from the queue, i.e. suppose N features are in the queue, then the probability of each feature being sampled is 1/N. This tactic encourages the diversity of the retrieved image features, benefiting the overall performance. However, some older features in the queue may largely fall behind the current model if the teacher network $g_t$ is updated quickly, eliciting unstable training.

"Most-Recent" Sampling

The sampling probability mass is allocated based on the freshness of image features, and the most recent feature has the highest chance to be retrieved. Specifically, suppose N features are in the queue $Q(|Q|>=N)$. Then for the i-th newest feature f, its weight $w_i=N-i+1$. Finally, the probability of the i-th newest feature being sampled is $w_i/\Sigma_{j=1}^N w_j$. This tactic ensures the retrieval of more up-to-date features and thereby stabilizes the learning. But it may hurt the overall performance due to a lack of feature diversity, as the chance of older features being sampled is small. Note that the feature queue is empty at the beginning of training.

In this case, the input image feature f' for the auxiliary tasks, and also enqueue it to Q that corresponds to the concept of the input image.

Concept-Guided Global Task

Given two views $\{I^{(1)}, I^{(2)}\}$ of an image I, a concept-guided global task may replace $I^{(1)}$ in the DINO loss with the image feature f sampled from the concept-feature dictionary, which becomes $$\mathcal{L}_{Global} = -h_t(f) \log h_s(g_s(I^{(2)}))\quad(1)$$

where $h_t$ and $h_s$ are the projection head of the teacher and student network, respectively, and $g_s$ is the student network. Intuitively, minimizing the global loss is equivalent to encouraging the similarity of any two different image features with the same concept. Hence, it can help produce more semantically consistent relational representations, in particular when the concepts stored in the concept-feature dictionary are themselves relational. Earlier approaches require a rather complex pre-processing stage, e.g. the images have to be split in terms of the concept before training, making them not directly applicable to existing training pipelines. Rather, with the proposed concept-feature dictionary that dynamically saves & retrieves image features from the running storage, the current concept-guided global task becomes a straightforward task to existing training pipelines.

Concept-Guided Local Task

In one embodiment, a concept-guided local task aims at facilitating object-centric learning, by the means of correspondence learning. Correspondence may be possibly learned with SSL. However, only low-level correspondence between two augmented (e.g. rotated) views of an image can be discovered, while the semantic information of objects is missing. To remedy this, concepts are added to these methods, providing them with the capability of learning semantic correspondence from images.

Specifically, suppose we have two views $\{I^{(1)}, I^{(2)}\}$ of an image I, and we also tokenize the image feature into a sequence of N local image tokens. Then at the output of ViT, $$g_t(I^{(1)})=[z_1^{(1)}, \ldots, z_N^{(1)}] \text{ and } g_s(I^{(2)})=[z_1^{(2)}, \ldots, z_N^{(2)}]$$

is obtained, where z denotes the local feature. Prior work relies on the local features $g_t(I^{(1)})$ and $g_t(I^{(2)})$ for the local task. Instead, $g_t(I^{(1)})$ is replaced with the image feature f retrieved from the concept-feature dictionary using the concept of the image I. f is then split into multiple local features. i.e. $f=[z_1^{(f)}, \ldots, z_N^{(f)}]$ and the concept-guided local loss becomes $$\mathcal{L}_{Local} = -\frac{1}{N}\sum_{i=1}^N h_t(z_{j^*}^{(f)})\log h_s(z_i^{(2)}),\quad(2)$$

$$j^* = \underset{j}{\mathrm{argmax}} CosineDisatance(z_j^{(f)}, z_i^{(2)}),$$

where $h_t(\bullet)$, $h_s(\bullet)$ are the projection heads that map local features to probability distributions. Intuitively, it greedily matches the output between two local regions that have minimal feature distance—bootstrapping the object-level semantic correspondence among images with the same concept.

Overall Loss

By combining the global and local tasks, an auxiliary task loss $\mathcal{L}_{aux}$ is added to the main loss $\mathcal{L}_{main}$ (e.g. cross-entropy loss of the reasoning task). The eventual objective is $$\mathcal{L} = \mathcal{L}_{main} + \alpha \mathcal{L}_{aux}, \mathcal{L}_{aux} = \mathcal{L}_{Global} + \mathcal{L}_{Local},\quad(3)$$

where a trade-off weight $\alpha$ is added for better flexibility. As mentioned above, the method will reduce to EsViT, a baseline without concept-guided auxiliary tasks, when the current input features $g_t(I^{(1)})$ are used instead of f retrieved from the dictionary for computing $\mathcal{L}_{Global}$ and $\mathcal{L}_{Local}$.

One exemplary goal is to seek a better inductive bias for visual relational reasoning, especially on real-world data. ViTs are a promising candidate due to their potential on relational reasoning, object-centric learning, and systematic generalization. RelViT, a simple yet efficient method for exploiting concepts in visual relational reasoning tasks is provided to boost the performances of ViTs. Two auxiliary tasks may be included in RelViT: a global task for semantically consistent relational representation, and a local task for learning object-centric semantic correspondence. These two tasks are made possible through the use of our proposed concept-feature dictionary. RelViT largely outperforms other counterparts on challenging visual relational reasoning benchmarks.

Figure 7:
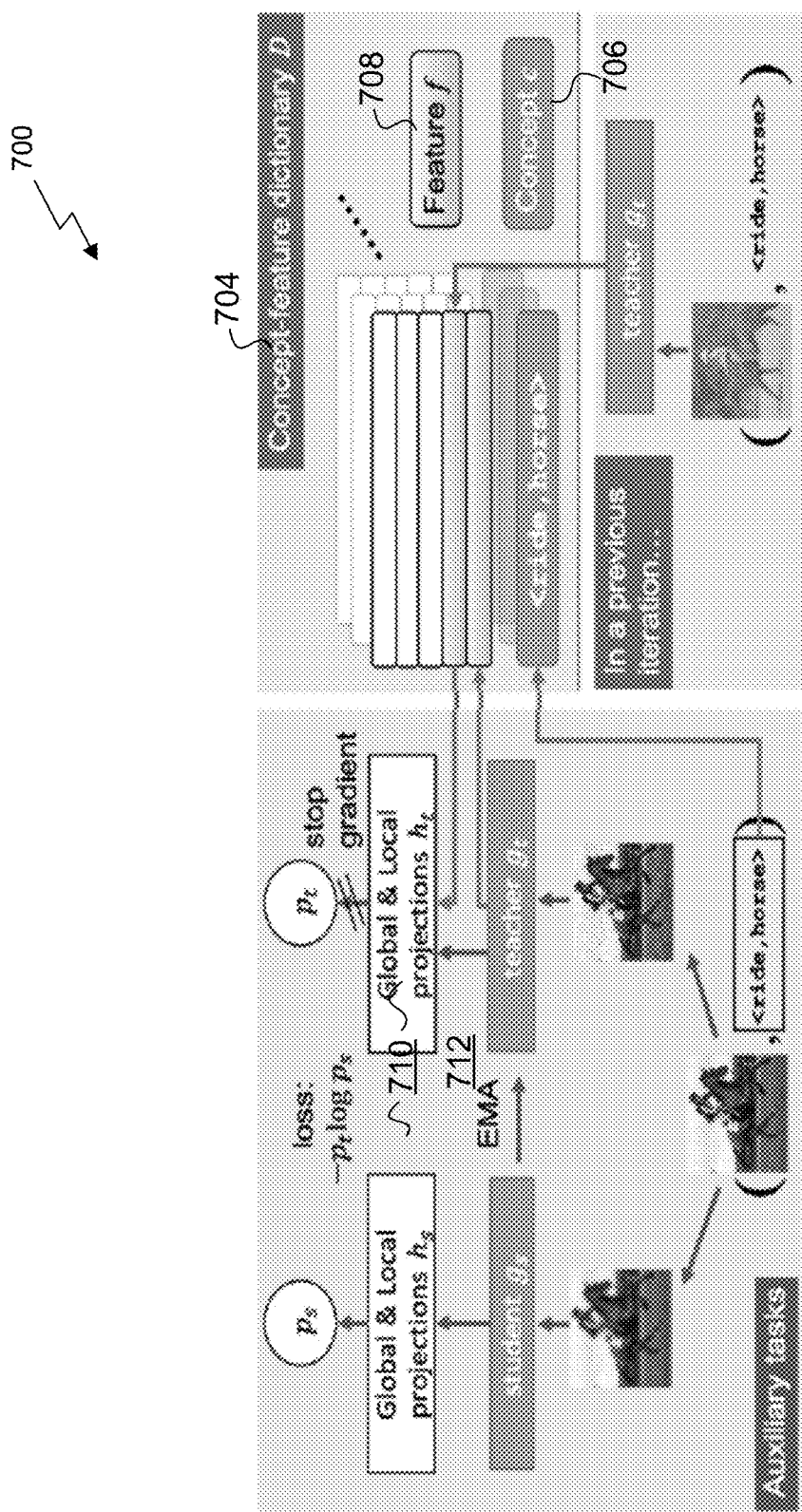
FIG. 7 illustrates an exemplary learning pipeline for a vision transformer (ViT), in accordance with an embodiment.

FIG. 7 illustrates an exemplary learning pipeline 700 for a vision transformer (ViT), according to one exemplary embodiment. As shown, a concept-feature dictionary 704 is included, where a key is a concept c 706 and its value is a queue of image features f 708 with the same concept 706, to allow flexible feature retrieval with the concept keys. With the proposed dictionary 704, the concept-guided global and local tasks 710 are developed. EMA 712 denotes the exponential moving average.

System and Method for Visual Relational Reasoning Using Vision Transformers

In one embodiment, vision transformers (ViTs) may be used as a base model for visual relational reasoning, and concepts defined as object entities and their relations may be used to improve the reasoning ability of ViTs. Specifically, several properties of ViTs make it them a compelling model choice for visual relational reasoning. First, the self-attention mechanism in ViT offers a strong relational inductive bias, explicitly modeling the relations between input entities. Second, the design of image-as-patches facilitates the learning of object-centric representations without label annotations. To make better use of concepts, a concept-feature dictionary may be provided, where each key is a concept and its value is a queue of image features with the same concept. This may allow dynamic and flexible training-time image feature retrieval during training. Based on this dictionary, the canonical ViT training pipeline may be augmented with two auxiliary tasks: first, to facilitate high-level reasoning about relationships, a global task may be designed that helps cluster images with the same concept together to produce semantically consistent relational representations. Second, to learn better object-centric representations, a local task may be developed that guides the model to discover object-centric semantic correspondence across images. The resulting model may be called a concept-guided vision transformer (RelViT).

First, the method RelViT does not leverage pre-trained object detectors to explicitly identify object entities for learning their representations. Instead, RelViT directly obtains object-centric representations from unstructured inputs (e.g., raw images) by incorporating object concepts into the training of vision transformers. The implicit representations of object entities and their relationships learned in RelViT become more versatile and efficient, compared with external object detectors. Second, RelViT does not rely on explicit symbolic programs for reasoning. Instead, RelViT is an end-to-end neural approach that adds concepts of objects and their relations to its training objective, in the form of auxiliary global and local tasks, based on a novel concept-feature dictionary. This way, RelViT can be applied to open-ended real-world domains, rather than only focusing on controlled and synthetic domains. Finally, compared with standard ViT, RelViT achieves better systematic generalization by learning the auxiliary tasks of predicting human-specified concepts. Thanks to the plug-and-play feature of the concept-feature dictionary, auxiliary tasks can be easily incorporated into existing ViT training pipelines without additional input pre-processing. This may enable the adapting of various ViTs to visual relational reasoning tasks.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
    accessing a training image labeled with information defining a concept depicted in the training image and a concept-feature dictionary that correlates image features with image concepts, each of the image concepts indicating a relationship between at least two depicted objects; and
    training a machine learning environment from the training image and the concept-feature dictionary to be able to infer a concept depicted in a given image, the training including:
    (a) performing a global training operation within the machine learning environment by:
    retrieving an image feature from the concept-feature dictionary, utilizing the concept depicted in the training image; and
    performing contrastive learning using the training image or an augmented version of training image, and the retrieved image feature; and
    (b) performing a local training operation within the machine learning environment by:
    retrieving the image feature from the concept-feature dictionary, utilizing the concept depicted in the training image;
    tokenizing the training image or an augmented version of the training image to create image tokens; and
    performing contrastive learning using the image tokens and the retrieved image feature.

2. The method of claim 1, wherein the machine learning environment includes a vision transformer (ViT).

3. The method of claim 1, wherein the machine learning environment includes a convolutional neural network (CNN).

4. The method of claim 1, wherein each of the image concepts within the concept-feature dictionary is represented by a key, the key including a tuple that defines the at least two objects and an associated action, and wherein each of the image features within the concept-feature dictionary is represented by a value.

5. The method of claim 4, wherein each key within the dictionary is linked to a value.

6. The method of claim 1, wherein training the machine learning environment includes performing the global training operation.

7. The method of claim 6, wherein the global training operation trains a global task within the machine learning environment that clusters images with the same concept together to produce semantically consistent relational representations.

8. The method of claim 1, wherein training the machine learning environment includes performing the local training operation.

9. The method of claim 8, wherein the local training operation trains a local task within the machine learning environment that guides the machine learning environment to discover object-centric semantic correspondence across images.

10. The method of claim 1, further comprising, at the device:
updating the concept-feature dictionary while the machine learning environment is being trained.

11. A system comprising:
a hardware processor of a device that is configured to:
access a training image labeled with information defining a concept depicted in the training image and a concept-feature dictionary that correlates image features with image concepts, each of the image concepts indicating a relationship between at least two depicted objects; and
train a machine learning environment from the training image and the concept-feature dictionary to be able to infer a concept depicted in a given image, the training including:
(a) performing a global training operation within the machine learning environment by:
retrieving an image feature from the concept-feature dictionary, utilizing the concept depicted in the training image; and
performing contrastive learning using the training image or an augmented version of training image, and the retrieved image feature; and
(b) performing a local training operation within the machine learning environment by:
retrieving the image feature from the concept-feature dictionary, utilizing the concept depicted in the training image;
tokenizing the training image or an augmented version of the training image to create image tokens; and
performing contrastive learning using the image tokens and the retrieved image feature.

12. The system of claim 11, wherein the machine learning environment includes a vision transformer (ViT).

13. The system of claim 11, wherein the machine learning environment includes a convolutional neural network (CNN).

14. The system of claim 11, wherein each of the image concepts within the concept-feature dictionary is represented by a key, the key including a tuple that defines the at least two objects and an associated action, and wherein each of the image features within the concept-feature dictionary is represented by a value.

15. A non-transitory computer-readable storage medium storing instructions that, when executed by a processor of a device, causes the processor to cause the device to:
access a training image labeled with information defining a concept depicted in the training image and a concept-feature dictionary that correlates image features with image concepts, each of the image concepts indicating a relationship between at least two depicted objects; and
train a machine learning environment from the training image and the concept-feature dictionary to be able to infer a concept depicted in a given image, the training including:
(a) performing a global training operation within the machine learning environment by:
retrieving an image feature from the concept-feature dictionary, utilizing the concept depicted in the training image; and
performing contrastive learning using the training image or an augmented version of training image, and the retrieved image feature; and
(b) performing a local training operation within the machine learning environment by:
retrieving the image feature from the concept-feature dictionary, utilizing the concept depicted in the training image;
tokenizing the training image or an augmented version of the training image to create image tokens; and
performing contrastive learning using the image tokens and the retrieved image feature.

* * * * *